Patented Jan. 9, 1934

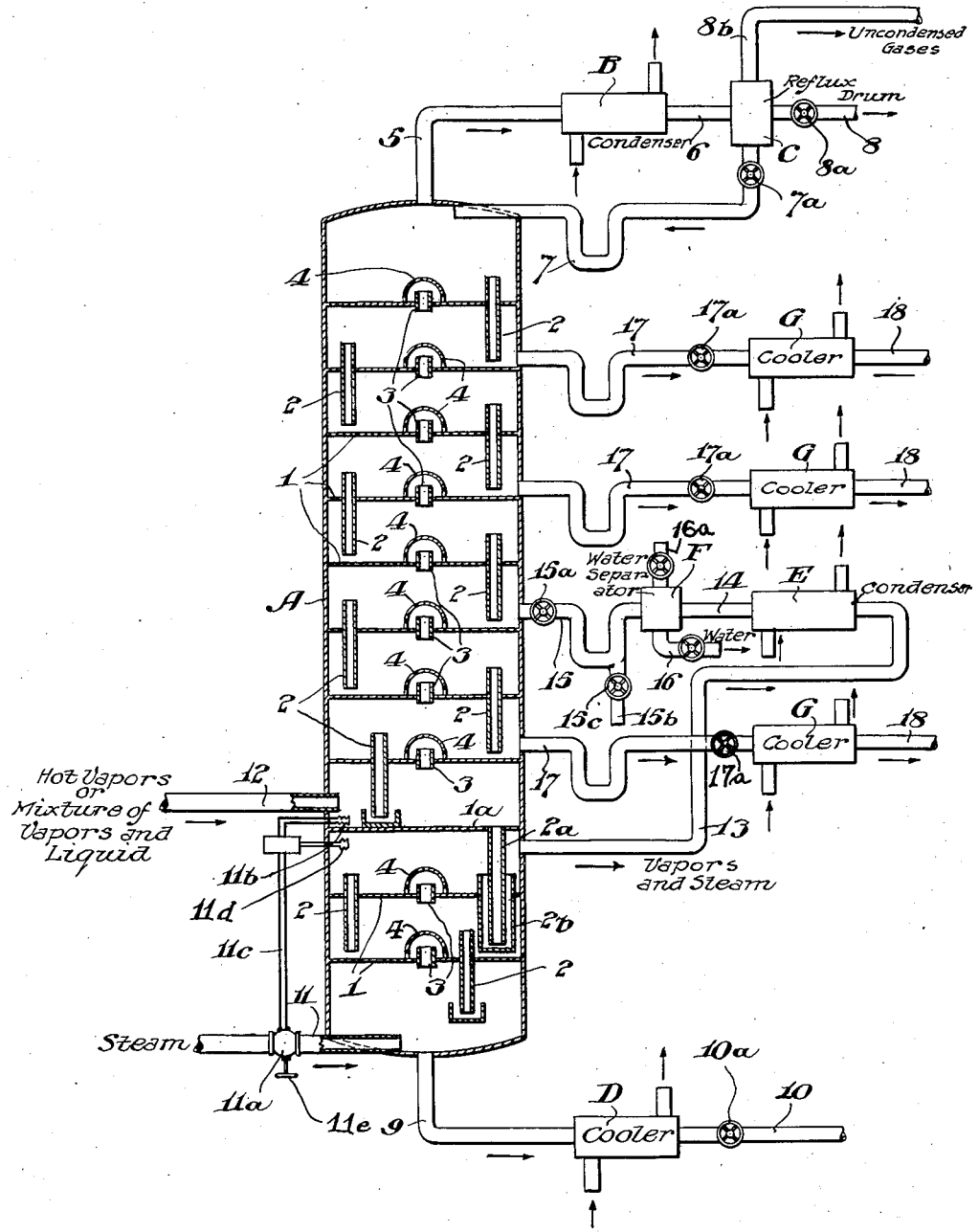

1,942,446

UNITED STATES PATENT OFFICE 1,942,446

FRACTIONAL DISTILLATION

Albert G. Peterkin, Jr., Bryn Mawr, Pa., assignor to The Atlantic Refining Company, Philadelphia, Pa., a corporation of Pennsylvania Application April 24, 1929. Serial No. 357,664

8 Claims. (Cl. 196—100)

My invention relates to the art of fractional distillation of hydrocarbon oils, particularly crude petroleum and petroleum products.

An object of my invention is to obtain a residual oil of high flash point without decreasing the capacity of the fractionating equipment and at the same time obtaining maximum yield of fractionated products.

In accordance with my invention, in the zone of the fractionating column into which are introduced vapors, or a mixture of liquid oil and vapors from a heater, such as a still, liquid is separated from the vapors, and the separated liquid is brought into contact with steam, or equivalent, while out of contact with said vapors, thereby vaporizing the lower boiling portion thereof. Furthermore, the steam used in such vaporization is not permitted to pass through the major portion of the fractionating column, and particularly the steam does not pass into or through the zone in which separation of liquid from the vapors is effected, or to or through any portion of the column above that zone.

A method of petroleum distillation rapidly gaining in favor among refiners comprises vaporizing a portion of the oil by passing it at high velocity through a tubular heater or pipe still, and introducing the mixture of liquid oil and vapors into a fractionating column after it has been sufficiently heated in the still. Since the unvaporized oil is in equilibrium with the vapors at the point at which the mixture is introduced into the fractionating column, there is a considerable amount of relatively low boiling constituents present in the liquid oil. In addition to the consequent loss of these valuable low boiling constituents, their presence in the residual oil has the effect of deleteriously affecting its properties, notably by lowering the viscosity and flash point of the residual oil. The reduction of flash point, particularly in the case where such liquid is to be used as a lubricating oil, reduces the market value of the final product.

By passing steam countercurrent to the liquid oil which passes from the zone in the column into which the oil from the heating means is introduced, these low boiling components of the liquid oil may be vaporized. If the vapors and steam are then passed through the fractionating column for fractionation of the vapors so produced, the capacity of the column, that is, the quantity of vapors which may be fractionated per unit of time, will be decreased due to the relatively large volume of steam which by present practice must necessarily be conducted through the portion of the column above the zone aforesaid. The volume of such steam may constitute around 40% or more of the total vapor volume which passes through the column.

In accordance with my invention, the oil vapors resulting from the steam treatment of the portion of the liquid oil which passes from the zone heretofore mentioned to the lower portion of the column are withdrawn from said lower portion of the column in mixture with the steam. The steam is then separated therefrom, whereupon the vapors may be passed back into the column.

For purposes of illustration, reference is had to the accompanying drawing which is a diagrammatic view of a vertical section of one form of apparatus which may be used in carrying out my process.

Referring to the figure, A is a fractionating column equipped with fractionating devices, which as illustrated, comprise bubbler plates 1 having downflow pipes 2 and vapor uptakes 3 equipped with bubbler caps 4. From the top of the column A, the vapor line 5 leads to a condenser B which is in turn connected by line 6 to a reflux drum C. Trapped line 7 controlled by a valve 7a leads from the reflux drum C to the upper portion of the column A, while pipe 8 controlled by valve 8a leads from said drum to a storage tank or the like (not shown). There is also the vent pipe 8b leading from drum C, for conducting away uncondensed gas.

From the lower end of column A, line 9 leads to cooler D which in turn is connected by line 10 controlled by valve 10a to suitable storage (not shown). At the lower portion of the column A is provided an inlet 11, for steam or equivalent, controlled by a pressure control valve 11a which is actuated by differential pressure responsive means 11b and 11d located in the column A just above and below the plate 1a respectively and connected to the valve by connection 11c. Valve 11a is also provided with a hand control 11e.

The pipe 12 leads from the outlet of a suitable heating means, as for example, from the outlet end of the heating tubes of a pipe still, to the fractionating column A. The plate 1a in column A immediately below the point at which the pipe 12 connects therewith, is not provided with a vapor uptake, as are the other plates in the column. This plate 1a is however provided with a downflow pipe 2a through which liquid collecting thereupon may pass to the plate in the column next below it or to that portion of the column therebelow. Downflow pipe 2a as shown is closed to the passage of vapors therethrough by means of a liquid seal 2b of suitable depth.

Communicating with the column A at a point below the plate 1a is the pipe 13 which leads to the condenser E, which in turn is connected by line 14 to water separator F. From the water separator there is the trapped line 15, provided with a valve 15a which leads back to the column A, to a point above that at which the oil from the heating means is introduced into the column, and preferably to that plate upon which collects liquid which most nearly corresponds in composition to that of the liquid so returned. The line 15 is also provided with a drawoff 15b controlled by valve 15c through which oil may be withdrawn from the system. In addition, there are the valve controlled lines 16 and 16a which communicate with the water separator F, the former to conduct water that separates therein from the oil, to sewer or other disposal (not shown), while the latter serves to conduct away uncondensed steam.

Trapped drawoffs 17 provided with valves 17a communicate with plates at desired levels in column A and connect with coolers G, which in turn are connected by lines 18 to suitable storage tanks or the like (not shown) for desired sidestream fractions.

In carrying out my process in the apparatus above described, vapors or a mixture of vapors and liquid oil from the heating means is passed through line 12 into the zone in the column A above plate 1a, where a separation of the vapors from liquid (which may be liquid introduced into the column with vapors or liquid coming from the plates higher in the column) is effected. The vapors pass upwardly through the column and are fractionated and the liquid passes downwardly through the downflow pipe 2a into the lower portion of the column.

The vapors which are not condensed in passing through the column A leave at its top through line 5 and are conducted into the condenser B where they are liquefied and the condensate passed through the line 6 into the reflux drum C where it is divided into two portions, one of which is conducted to storage through the line 8 while the other is returned through the line 7 to the upper portion of the column A, to serve as reflux liquid. The uncondensed gases pass out of the system through line 8b.

Steam at suitable temperature is passed into the lower portion of the column A through line 11 and rises countercurrent to the descending liquid coming from the plate 1a. Since this liquid passing downwardly through the lower portion of the column was in contact and in equilibrium with the vapors in the zone above plate 1a, it contains appreciable quantities of low boiling liquid. The effect of the steam in the treatment just described is to cause the vaporization of these low boiling constituents so that the oil upon reaching the lowermost portion of the column A will be relatively free from such constituents and will have a high flash point and high viscosity.

The vapors formed during the treatment just described along with the steam or equivalent are conducted from a point in the column below the level of the plate 1a through the line 13 into the condenser E where the vapors are liquefied, and the liquid along with the condensed and uncondensed steam then passes through the line 14 into the water separator F where the liquid oil and steam are separated. The oil so separated may then be passed through the trapped line 15 back into the column A at any suitable point above plate 1a; or may be withdrawn from the system through pipe 15b. The condensed portion of the steam may be passed through the line 16 to sewer or other disposal, and the uncondensed portion thereof passed out of the system through line 16a. It will be understood that all or a portion of the condensed oil may be withdrawn from the system through the drawoff 15b and the remainder passed into the column through line 15.

The liquid oil collecting in the lowermost portion of the column A is conducted through line 9 to cooler D, which, for example, may be a heat exchanger and may be used for preheating oil, and from the cooler the liquid oil may be passed through line 10 to storage. Likewise liquid from plates at desired levels in the column A may be withdrawn through the lines 17 and passed through coolers G and thence through lines 18 to storage.

The residual oils produced by my process are relatively free from low boiling components and consequently have a lower volatility, higher flash point and higher viscosity than residual oils produced by processes in which steam is not used for stripping such residual oils. At the same time the full capacity of the column is available for fractionation of oil vapors during the entire operation, since no steam is present in the portion of the column wherein fractionation of the vapors introduced into the column as such is effected.

My invention makes it possible to reduce the diameter of the fractionating column to the minimum since allowance in volume for the passage of steam therethrough is not required. At the same time products equal in quality as to flash point, volatility, viscosity, etc., to those obtained by the processes now in use, in which the steam used for stripping is allowed to pass through the entire length of the column, are procured.

What I claim is:

1. A system for fractionating oil comprising a fractionating column, an oil and vapor inlet intermediate the top and bottom of said column, fractionating structure in said column above said inlet, means below said inlet permitting liquid oil to pass downwardly in said column and preventing rise thereabove of vapors that may be formed therebelow, means for introducing steam into the column below said first named means for vaporizing a portion of the liquid oil below said first named means, means for condensing and separating from the steam the oil vaporized from said liquid oil, means for returning at least a portion of the condensate of the oil vaporized from said liquid oil into said fractionating column, and means for withdrawing liquid oil from the lower portion of said column.

2. In the art of fractionating oil, the method which comprises introducing the oil, at least a portion whereof is in the vapor state, into a fractionating column, in a zone of said column separating liquid oil from the vapors, conducting the liquid oil from said zone, bringing the liquid oil so separated into contact with steam while out of contact with said vapors whereby a portion of the liquid oil is vaporized, conducting the portion of the oil so vaporized in mixture with steam away from the unvaporized portion of the oil, condensing the vaporized portion of the oil, separating the oil condensate so formed from the steam, and passing at least a portion of the separated oil condensate into said fractionating column at a point therein higher than said zone.

3. The process which comprises introducing oil, which has been previously heated to such temperature that at least a portion thereof has been changed to the vapor state, into a zone of a fractionating column, separating the liquid oil from the vapors in said zone, conducting the liquid oil from said zone to a second zone immediately bringing the liquid oil so separated from the vapors into contact with steam while in said second zone whereby a portion of said liquid oil is vaporized, removing the vapors so formed in mixture with the steam from the column without permitting such vapors and steam to pass into and through said first mentioned zone, condensing said vapors so removed, separating the oil condensate so formed from the steam and passing it into the column above said first mentioned zone, and withdrawing liquid oil from the aforementioned second zone.

4. The process which comprises introducing oil, which has been previously heated to such temperature that at least a portion thereof has been changed to the vapor state, into a zone of a fractionating column, separating the liquid oil from the vapors in said zone, conducting the liquid oil from said zone to a second zone in said column, immediately bringing the liquid oil so separated while out of contact with said vapors into contact with steam while in said second zone whereby a portion of said liquid oil is vaporized, removing the vapors so formed in mixture with the steam from the column without permitting such vapors and steam to pass into and through said first mentioned zone, condensing said vapors so removed, separating the oil condensate so formed from the steam, withdrawing a portion of the condensate from the system and passing the remainder to a point in the column above said first mentioned zone, and withdrawing liquid oil from the aforesaid second zone in the column.

5. In the art of fractionation, the process which comprises passing into a fractionating system a vapor-liquid mixture consisting of a series of components of different boiling points, separating the higher boiling components from the lower boiling components, removing the higher boiling components in liquid phase from the lower boiling components, passing steam into contact with the higher boiling liquid so removed, whereby vaporization of at least a part thereof is effected, conducting the part so vaporized in mixture with steam out of contact with the part which remains liquid, condensing the vapors, separating steam therefrom, and returning the condensate to the fractionating system.

6. In the art of fractionation, the method which comprises separating the vaporized portion of a mixture, composed at ordinary temperatures of a series of liquid components of different boiling points, from the liquid portion thereof, passing the vaporized portion so separated into a fractionating system, passing the liquid portion into a stripping zone and effecting vaporization of a part thereof by passing a stripping medium into contact therewith, removing the part so vaporized along with portions of the stripping medium from said stripping zone, condensing such vaporized part and separating the stripping medium therefrom, and passing the condensate so obtained into the fractionating system aforesaid.

7. In the art of fractionation, the process which comprises passing liquid to be fractionated, at least a portion whereof is in the vapor state, into a fractionating system, separating the liquid portion from the vapor portion and removing it from the system, passing steam into contact with said liquid portion whereby vaporization of at least a part thereof is effected, conducting the part so vaporized in mixture with steam out of contact with the part which remains liquid, condensing the vapors, separating steam therefrom, and returning the condensate to the fractionating system.

8. In the art of fractionation, the process which comprises passing into a fractionating zone a vapor-liquid mixture, separating the vapor portion from the liquid portion, passing the liquid portion into a stripping zone, passing a stripping medium in the form of vapors into said zone and into contact with said liquid portion, thereby to effect vaporization of at least a portion of the liquid passing the portion so vaporized plus the stripping medium from the stripping zone into a separating zone, condensing the vapors and the stripping medium in the zone last mentioned, separating the condensate of vapors from the condensate of stripping medium, passing the condensate of vapors into the fractionating zone above the point at which the vapor liquid mixture is introduced thereinto, and removing the condensed stripping medium from the system.

ALBERT G. PETERKIN, Jr.